Feb. 13, 1940.　　　　　G. A. MOORE　　　　　2,190,479
METHOD AND MEANS FOR MAKING CONTAINERS
Filed Aug. 16, 1938
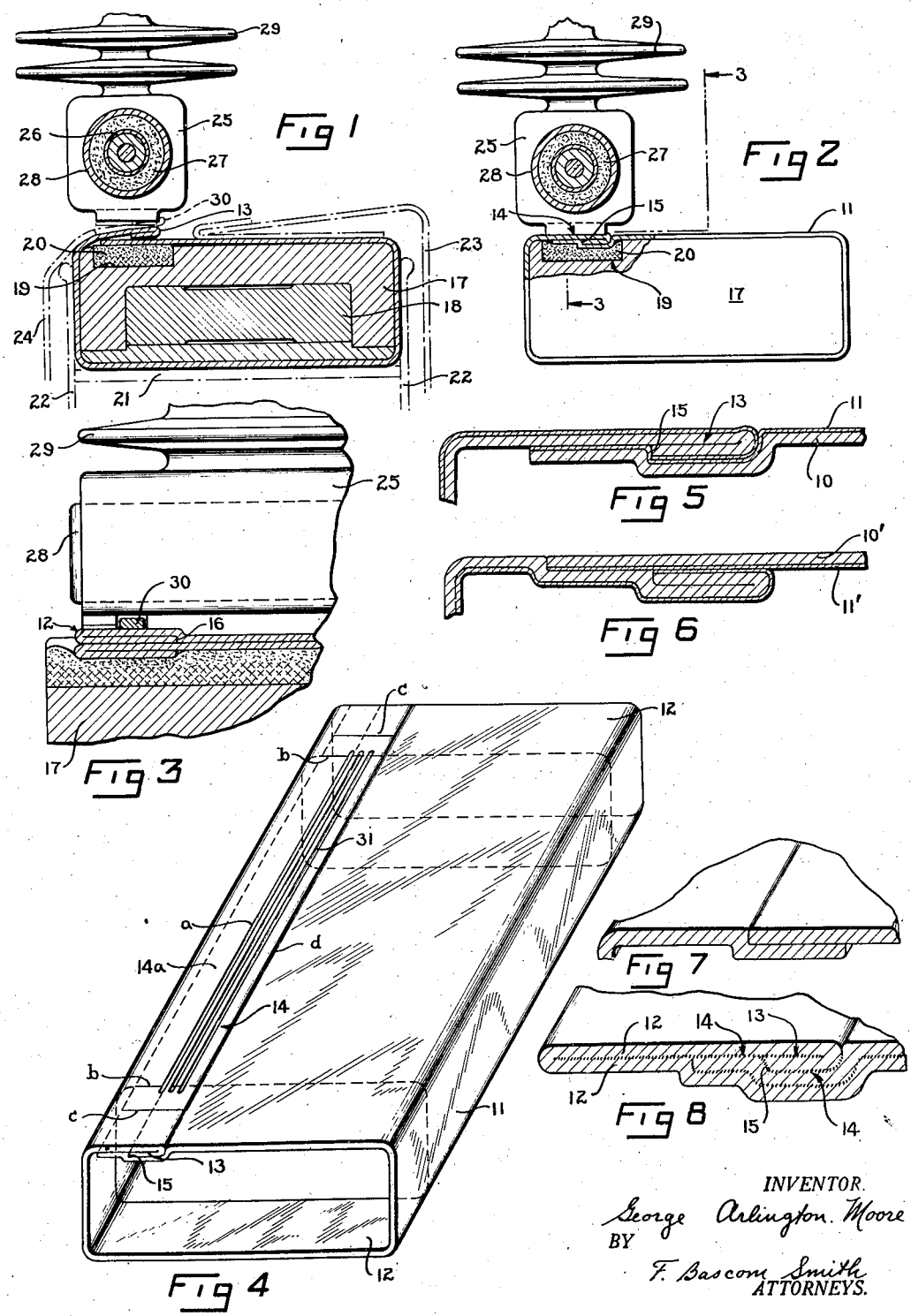
INVENTOR.
George Arlington Moore
BY
F. Bascom Smith
ATTORNEYS.

Patented Feb. 13, 1940

2,190,479

UNITED STATES PATENT OFFICE 2,190,479

METHOD AND MEANS FOR MAKING CONTAINERS

George Arlington Moore, Louisville, Ky., assignor to Humoco Corporation, Louisville, Ky., a corporation of Delaware Application August 16, 1938, Serial No. 225,113

13 Claims. (Cl. 93—36)

This invention relates to containers and more particularly to methods and means for joining overlapping portions of materials adapted to be adhesively sealed together in an impervious manner for forming articles such as container bodies, for example.

It has been heretofore proposed to form junctures, such as in the fabrication of containers or container bodies made of paper and metallic foil and other flexible materials, by the application of heat and pressure for activating a dry film of thermoplastic adhesive interposed between the surfaces being joined. A great amount of difficulty has been encountered, however, in making these junctures sufficiently strong in instances where high speed production is a highly desirable or paramount factor. Another heretofore insurmountable difficulty in making junctures of the above nature has been in consistently providing an air-tight, moisture-proof seam or joint, particularly when edges of the material to be joined extend longitudinally or transversely therethrough and when the thickness of the seam varies. The methods of heat sealing heretofore used generally fail to provide an air-tight juncture either because the adhesive, especially during high speed fabrication, is not properly and sufficiently activated over the entire seam surface, or because the activated adhesive is not permitted to set properly or quickly enough. When the adhesive sets too slowly, as when it is not removed from the influence of heat, and the parts to be joined are under tension from folding or bending, as the same ordinarily are, said parts separate sufficiently to permit the entrance of air which prevents the desired adherence of the engaging surfaces thereof. Irregularities in the materials or sealing means and particularly varying thicknesses, such as may be caused by varying numbers of layers of material in different parts of the joint, have heretofore prevented the application of sufficient sealing pressure at all points along the joint, and minute holes or unsealed spaces along the seam, which permit the passage of air and moisture, have accordingly resulted. It is necessary, in order to obtain proper activation of the adhesive, that the sealing iron have intimate contact with the seam throughout its entire length. Accordingly, under present methods, the slightest distortion of the contact surfaces of the sealing irons or the surfaces against which the same operate may result in an unsealed spot and hence a seam which will permit the passage of air and moisture. Difficulty has also been experienced in preventing pocketed vapors, generated during the application of heat, from parting the seam before the adhesive has time to set.

It is therefore an object of the present invention to provide a novel method for consistently producing, at high speed, heat-sealed junctures which are strong, durable, and impervious to both air and moisture.

Another object of the invention is to provide novel means whereby the novel method above referred to may be effectively and inexpensively practiced.

A further object is to provide a novel method and means for insuring quick and proper activation by heat and pressure of a dry adhesive substance interposed between the two surfaces to be joined thereby.

Still another object is to provide novel means and method whereby the irregularities and varying thicknesses in heat sealed junctures may be compensated for, to thereby insure sealing at all points and hence the hermeticity of the junctures.

The above and further objects and novel features of the invention will more fully appear from the following detailed description when the same is read in connection with the accompanying drawing. It is to be expressly understood, however, that the drawing is designed for the purpose of illustration only and is not intended to define the limits of the invention, reference being primarily had for this latter purpose to the appended claims.

In the drawing, wherein like reference characters refer to like parts throughout the several views, Fig. 1 is an end elevation, partly in section and with parts broken away, illustrating one form of apparatus for carrying out the novel method of the invention;

Fig. 2 is a similar view showing the sealing iron in operative position;

Fig. 3 is an enlarged side elevation of said apparatus, partly in section and with parts broken away, the section being taken substantially on line 3—3 of Fig. 2;

Fig. 4 is an isometric view of one type of container body which may be formed in accordance with the present invention; and, Figs. 5, 6, 7 and 8 are cross-sectional detail views illustrating various types of seams or joints which may be formed in practicing the method of the invention.

The novel means and method comprehended by the present invention are shown in the drawing and hereinafter described, by way of example, in their application to the making of tubular container bodies from blanks of flexible material, such as paper and metallic foil. It will, of course, be understood that the invention may be practiced in forming junctures between the above and similar materials for any purpose whatsoever.

A preferred type of container body which may be made in accordance with the present invention and which may be employed in making a container of the type disclosed in the copending application of George Arlington Moore, Serial No. 153,705, filed July 15, 1937, is constituted by a single laminated blank having an inner layer 10 of fibrous material, such as paper, and an outer layer 11 of impervious material, such as metallic foil (Fig. 5). The outer foil surface of blank 10, 11 is preferably coated over its entire surface with a thin dry film of thermoplastic lacquer or other similar substance having potential adhesive properties. One type of lacquer which has been found suitable for this purpose is Beckwith-Chandler Co. Lacquer No. 017308, a lacquer having a solids content of about 26%. The side margins of the blank are preferably folded inwardly to form hems 12, 12 (Figs. 3 and 4) and a marginal portion at one end of the blank is folded inwardly to form a hem 13 for the purpose of providing the finished container with metal-to-metal closure seams in the manner more fully disclosed in the above-mentioned copending application. If desired, the hemmed marginal portions of fibrous lamina 10 may be coated with a thin dry film of thermoplastic adhesive, such as Pliolite, a chlorinated rubber product, for securing the infolded portions of hems 12 and 13 in place.

The tubular body (Fig. 4) may be formed from blank 10, 11 by folding the latter, preferably around a mandrel or arbor, with the ends thereof overlapping and sealed together to form a longitudinal side seam 14 by the application of heat and pressure which activate the thermoplastic films previously applied to the engaging surfaces of the overlapping portions and press the same into the interstices of the material. As shown in Fig. 5, the foil surface of the infolded portion of hem 13 is brought into contact with the foil surface of the opposite end of blank 10, 11 and the overlapping portions of the two ends are substantially twice the width of said hem. It will be seen that, in the longitudinal side seam of the tubular body thus formed, the portion of the seam between the inner edges of hems 12 at opposite ends of the body is made up partly of three thicknesses of the blank and partly of two thicknesses thereof, as best seen in Fig. 5. Adjacent each end of the body, where the side seam contains hem 12, said seam is made up partly of six thicknesses of the blank and partly of four thicknesses thereof.

It will be obvious that a seam of this character is difficult to seal in an impervious manner since the thicker portions thereof prevent the hot sealing iron from coming into intimate contact with, and applying a sufficient pressure to the thinner portions of the seam. Additionally, the particular seam or joint described above has an edge 15 of blank 10, 11 extending longitudinally thereof and the inner edges 16 (Fig. 3) of hems 12 extend transversely therethrough. Heretofore, it has been substantially impossible, even when comparatively thin stock was employed, to adhesively heat seal a seam so as to prevent the leakage of air and moisture along edges of the material passing through the seam. Inequalities in the thickness of various portions of the blank itself and the difficulty of maintaining the sealing iron or irons in parallel relationship with the mandrel or with each other have also been material factors in the failure of others to produce air-tight, adhesively sealed junctures.

The heating anvil and mandrel can very easily have or develop slight inequalities in their contact surfaces which prevent the making and maintaining of intimate contact between the seam and anvil, and very slight distortions or irregularities in the anvils or mandrels will leave spots along the seam which are not properly activated. Where air is present in the seam as a result of insufficient contact and pressure, the adhesive cannot be properly activated. Efforts have been made to compensate for the above irregularities by contouring the face of the sealing irons or mandrel, but it is impossible as a practical matter to get consistent registry with the necessary accuracy between the material and the machine parts.

Another factor in the failure of others in their endeavors to provide an impervious, adhesively sealed juncture between engaging surfaces of fibrous or like materials has been their failure to properly control the flow of heat employed and the storage thereof. For example, heat sealed junctures have been made heretofore by employing two substantially equally heated sealing irons pressing against opposite sides of the seam or by employing one hot sealing iron and a cold metal backing plate or mandrel. In the first instance, there is no actual flow of heat from one heated iron to the other through the adhesive films and such flow is necessary to get quick and proper activation of the dry films of adhesive. The heat flows from both sides to the center, thereby causing such an accumulation of vapors that the gaseous pressure ruptures the seam or causes blisters as soon as the pressure of the iron is released. Also, when two equally heated irons are used, the fibrous material becomes very hot and, being a poor conductor of heat, retains the same for an appreciable period after withdrawal of the heating irons, thereby preventing quick setting of the activated adhesive. In the second method mentioned above, the heat flows so rapidly from the hot iron to the cold iron that the adhesive is not activated until a considerable amount of heat has been absorbed by the cold iron, unless such a high degree of heat is employed that the lacquer coating on the outer surface of the material is decomposed, thereby detracting from the appearance of the container and, at times, fouling the sealing irons. In high speed production, a properly heated sealing iron cannot ordinarily be held in contact with the seam sufficiently long to properly activate the adhesive under these conditions and when the seam, after the formation thereof, remains in contact with the initially cold iron, such as a mandrel, the large quantity of heat absorbed by the latter prevents quick setting of the adhesive which has been activated. When quick setting is not obtained, air tends to enter the seam and the engaging portions thereof, being under some tension, tend to pull apart.

A novel method and novel means for practicing the same are accordingly provided by this invention for overcoming the foregoing difficulties. In the embodiment shown, said novel means comprises a metallic mandrel or arbor 17 of rectangular cross-section which may be slidably mounted on a support 18. Along the side of arbor 17 against which the overlapping ends of blank 10, 11 are pressed during the seam sealing operation, said arbor is provided with a longitudinally extending recess 19 in which a pressure equalizing pad or element 20 is firmly embedded. Said pad is of a resilient, yielding nature and preferably comprises an outer face of rubber vulcanized on a fabric base.

One suitable means for wrapping blank 10, 11 about mandrel 17 is illustrated and described in the copending application of George Arlington Moore, Serial No. 173,101, filed November 6, 1937. A portion of said means, shown in phantom in Fig. 1, comprises a plate 21 for holding the central portion of the blank against the lower face of arbor 17, a pair of blades 22 for folding the ends of the blank upwardly against opposite sides of the arbor, and members 23 and 24 for folding the ends of the blank inwardly against the upper face of the arbor and into overlapping relation directly above pad 20.

In order to activate the adhesive film disposed on the engaging surfaces of the overlapping ends of blank 10, 11, the lapped portions are engaged and pressed together by a sealing iron 25. The latter may be heated by any suitable means, electrical heating means being employed in the illustrated embodiment. The heating cartridge is removably mounted in iron 25 and comprises a heating coil 26 wound on a suitable core and surrounded by a magnesium insulator 27 and a metallic casing 28. Cooling fins 29 are provided on iron 25 for minimizing the transfer of heat from the latter to the supporting means therefor. For a purpose to appear hereinafter, the face of iron 25 is relieved or recessed at the opposite ends thereof so that hems 12 will not be subjected to material heat and pressure and to provide for the passage of yieldable fingers 30 which serve to hold the overlapped ends of blank 10, 11 in position during the descent of iron 25. If desired, fingers 30 may be integral with plate 24, which preferably extends substantially the full length of arbor 17 or said fingers may be omitted.

From the disclosure of Figs. 2 and 3, it will be seen that pad 20 yields under the pressure of the sealing iron and presents a pressure resisting face which permits the application of a substantial pressure to all parts of seam 14 irrespective of the varying thickness thereof and irrespective of any misalignment between the operating faces of the arbor and heating iron. The yielding of pad 20 compensates for the variations in the thickness of seam 14 and causes the layers to be pressed into close contact with the edges of material in the seam, such as edge 15. There will be a unidirectional flow of heat from iron 25 through seam 14 and since pad 20 is a poor conductor of heat, said flow will be at a sufficiently low rate so that the adhesive film will be quickly and adequately activated and pressed into the interstices of the material. Additionally, pad 20 absorbs little, if any, heat during the short heating interval and accordingly does not hamper the substantially instantaneous setting of the adhesive after withdrawal of the setting iron. In one embodiment of mechanism which has been constructed for carrying out the method of the present invention, it has been found that, in forming a juncture of the particular type described and embodying the materials stated, an efficient temperature for iron 25 is from 400° to 450° Fahrenheit when the contact period is approximately one second and the pressure applied is from 1500 to 2000 pounds.

In sealing seams of the character of seam 14 which embodies multiple folds, it has been found in practice that, if the entire seam is simultaneously pressed by the sealing iron, gases will be formed and trapped within said folds and cause blisters or ruptures the moment the external sealing pressure is released. If blisters are formed without causing a rupture, the trapped gases are very apt to cause ruptures upon further folding of or application of pressure to the blistered portion. The gases referred to are formed principally from air trapped within the folds when the sealing iron abruptly and quickly engages the entire area of the seam and by the vaporization of the normal moisture content of the fibrous component of blank 10, 11, it being necessary that the fibrous material contain some moisture in order to obtain best results in the working thereof.

In the particular embodiment of the seam shown in Fig. 4, for example, it can be readily seen from Fig. 1 that, if sealing iron 25 moves rapidly, as it does in practice, into contact with the entire area of seam 14, air will be trapped within the space adjacent edge 15 of hem 13 and within the folds of hems 12 and 13. Additionally, the heat from iron 25, does not flow through the multiple thickness of said hems as rapidly as it does through the two-ply portions of the seam so that said latter portions might be sealed together before the formation of moisture vapor occurs in the hem folds, thereby cutting off any avenue of escape for said vapor. Air and vapor in prohibitive quantities may accordingly be trapped within the seam and destroy the imperviousness of the same or cause blisters therein after the release of the external sealing pressure and before the activated adhesive has a chance to set, it being impossible for these gases to escape through the non-porous, non-absorbent metallic lamination 11 without rupturing the same.

In order, therefore, to insure the imperviousness of seam 14, the face of iron 25 is preferably so shaped or contoured that heavy pressure is applied only to the U-shaped area of said seam which is bounded by lines a, b, c, and d (Fig. 4). A lesser pressure is applied to the area 14a, which is bounded by lines a and b, thereby providing a vent for the gases referred to above. The pressure applied to area 14a is preferably only sufficient to tack the single-play overlapping end of blank 10, 11 in position. The marginal end areas of seam 14 beyond the lines c are preferably not pressed and subjected to heat for the additional reason that it is highly desirable to avoid any ill effects of the heat on the adhesive coatings on the inner surfaces of hems 12, which coatings are to be subsequently employed for heat sealing the ends of the tubular body. It will be understood, however, that pressure and heat may be applied to the ends of seam 14, if desired, to seal the same at the same time that the central portion of said seam is sealed. Additionally, the face of sealing iron 25 may be ribbed so as to press one or more longitudinal flutes 31 (Fig. 4) in the central portion of seam 14 to further insure the hermeticity thereof.

In Figs. 6 and 7, there are shown two alternative types of seams or junctures which may be made by practicing the present invention. In Fig. 6, the metal lamina 11' is shown on the inside of the body and fibrous lamina 10' on the outside. In Fig. 7, a simple paper-to-paper seam is shown.

Fig. 8 illustrates one manner in which the ends of the body of Fig. 4 may be sealed. The opposed halves of the inner face of hem 12 are pressed into contact and heat sealed by the application of heat and pressure.

There is thus provided a novel method and means whereby variations in thickness may be readily and automatically compensated for in the formation of heat sealed junctures between flexible materials, such as paper and foil. A novel means and method are also provided for insuring proper activation and quick setting of a heat activated adhesive in a juncture of the above type.

Although only a single embodiment of the invention has been illustrated and described in detail, it is to be expressly understood that the same is not limited thereto. Various changes may be made, for example, in the design and arrangement of parts illustrated and in the materials specified without departing from the spirit and scope of the invention, as will now be apparent to those skilled in the art. For a definition of the limits of the invention, reference is had primarily to the appended claims.

What is claimed is:

1. In the art of making containers comprising fibrous materials, the method which includes coating a blank of sheet material with a film of thermoplastic adhesive, drying said adhesive, folding said sheet to form a tubular body with opposed ends of the blank in overlapping relation, and applying heat and pressure to said overlapping ends throughout a major portion of the length thereof at the same time to activate the coating of thermoplastic adhesive interposed therebetween while yieldingly resisting deformation of the material of said overlapping ends.

2. In the art of making containers, the method which includes the steps of coating the surface of a blank with a thermoplastic adhesive, drying said adhesive, placing portions of said blank in juncture-forming relation, and applying heat and pressure to said portions by means of a linearly movable sealing iron; while yieldingly resisting deformation of said portions.

3. In the art of making containers, the method which includes coating a layer of flexible material with a heat-activatable adhesive, placing said coated layer in overlapping relation with another layer of flexible material, supporting the overlapping portions of said layers adjacent relatively stationary flexible pressure resisting means, pressing said portions against said means with a linearly movable pressure die, and applying heat to said portions to activate the adhesive coating therebetween.

4. In the art of making containers, the method which includes applying a thin dry coating of thermoplastic adhesive to a blank, folding said blank about a mandrel with the ends of said blank in overlapping relation over a yieldable portion of said mandrel, said yieldable portion being mounted in a groove in the metallic portion of said mandrel, pressing said overlapping ends against said yieldable portion by means of a linearly movable pressure element, and applying heat to said overlapping ends to activate the adhesive interposed between the engaging surfaces of said ends.

5. In the art of making containers comprising fibrous materials, the method which includes coating a blank of sheet material with a film of thermoplastic adhesive, drying said adhesive, folding said sheet to form a tubular body with opposed ends of the blank in overlapping relation, and applying heat and pressure to said overlapping ends throughout a major portion of the length thereof at the same time to activate the coating of thermoplastic adhesive interposed therebetween while supporting said overlapping ends on means having low heat conductivity.

6. In the art of making containers, the method which includes applying a thin dry coating of thermoplastic adhesive to a blank, folding said blank about a form with the ends of said blank in overlapping relation in contact with a portion of said form having low heat conductivity, pressing said overlapping ends throughout a major part of the length thereof against said portion, and applying heat to said overlapping ends to activate the adhesive coating interposed between said ends.

7. The method of forming junctures between flexible materials which includes placing portions of said materials in juncture-forming relation with a dry film of thermoplastic adhesive therebetween, pressing said portions by means of a linearly moving die against a stationary support having a yieldable surface, and applying heat to said portions to activate said adhesive.

8. The method of forming junctures between flexible materials which includes placing portions of said materials in juncture-forming relation with a dry film of thermoplastic adhesive therebetween, pressing said portions by means of a linearly moving element against a stationary support having low heat conductivity, and applying heat to said portions to activate said adhesive.

9. The method of forming junctures between flexible materials which includes placing portions of said materials in juncture-forming relation with a dry film of thermoplastic adhesive therebetween, pressing said portions by means of a linearly moving element against an unheated stationary support having a yieldable surface and low heat conductivity, and applying heat to said portions during the application of pressure to activate said adhesive.

10. In apparatus for forming containers, a mandrel having a yieldable portion, means for wrapping a blank about said mandrel with the end portions of said blank in overlapping relation, and linearly movable means for pressing the overlapping end portions of said blank against said yieldable portion of the mandrel throughout a major part of the length of said end portions at the same time.

11. In apparatus for forming containers having means for wrapping a blank about a mandrel with the end portions of said blank in overlapping relation, the combination with said means of a mandrel having a rigid portion and a yieldable portion, said yieldable portion being mounted in a groove in said rigid portion and having one face thereof forming a part of the outer surface of the mandrel, and means for pressing the overlapping end portions of said blank against the exposed face of said yieldable portion of the mandrel.

12. In apparatus for forming a tubular container body from a blank of foldable material, a mandrel having a rigid portion and a yieldable portion, said yieldable portion being embedded in a groove in said rigid portion and extending in the direction of the longitudinal axis of the mandrel, the exposed face of said yieldable portion being substantially flush with the outer surface of the mandrel, and linearly movable means for applying heat and pressure to overlapping portions of said blank interposed between said means and said yieldable portion.

13. In apparatus for forming containers, a mandrel comprising a rigid portion having a groove therein and a rubber composition insert in said groove, and means for exerting pressure on superimposed layers of flexible material interposed between said means and said insert.

GEORGE ARLINGTON MOORE.